C. H. CHAMPANGE.
NECKTIE RETAINER.
APPLICATION FILED OCT. 8, 1915.
1,179,279.
Patented Apr. 11, 1916.
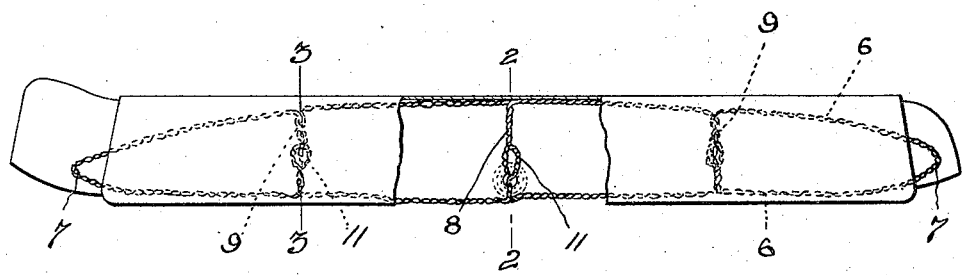
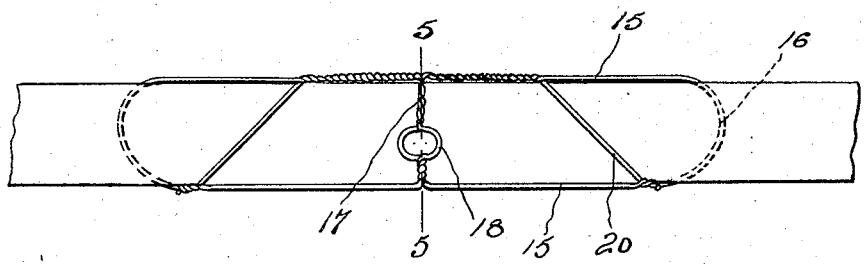
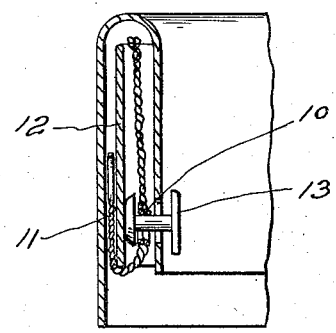
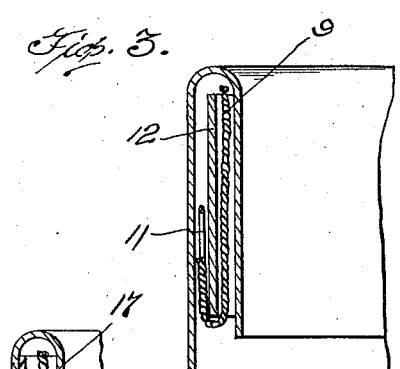
Witnesses
Inventor
C. H. Champange

UNITED STATES PATENT OFFICE.

CHARLOTTE H. CHAMPANGE, OF RHINELANDER, WISCONSIN.

NECKTIE-RETAINER.

1,179,279.    Specification of Letters Patent.    Patented Apr. 11, 1916.

Application filed October 8, 1915. Serial No. 54,857.

*To all whom it may concern:*

Be it known that I, CHARLOTTE H. CHAMPANGE, a citizen of the United States, residing at Rhinelander, in the county of Oneida and State of Wisconsin, have invented certain new and useful Improvements in Necktie-Retainers; and I do hereby declare the following to be a full, clear, and exact description of the invention, such as will enable others skilled in the art to which it appertains to make and use the same.

This invention has for its primary object to provide a simple and efficient retainer constructed of wire and designed for insertion between the folds of a turndown collar to retain the necktie in position and to permit the latter to be moved longitudinally.

With this and other objects in view, the invention consists in the novel construction, arrangement and formation of parts as will be hereinafter specifically described, claimed and illustrated in the accompanying drawing, in which:

Figure 1 represents a side elevation of the improved necktie retainer, illustrating a fragment of a collar, Fig. 2 represents a transverse sectional view on the line 2—2 of Fig. 1, Fig. 3 represents a transverse sectional view on the line 3—3 of Fig. 1, Fig. 4 represents a side elevation of a slightly modified type of the necktie retainer, and Fig. 5 represents a transverse sectional view on the line 5—5 of Fig. 4.

Referring to the drawing in detail, wherein similar reference numerals designate corresponding parts throughout the several views, the numerals 6 indicate the longitudinal members of the frame or body of the retainer, and the opposite ends of the longitudinal members are connected, as at 7, to provide front collar button-engaging members. The longitudinal members 6 are connected centrally by a central connecting member 8 and intermediate connecting members 9. The central connecting member 8 is provided with a loop 10 adapted to receive the rear collar button, as clearly illustrated in Fig. 2, to retain the central portion of the necktie retainer in proper position between the folds of a turndown collar. Each of the connecting members 8 and 9 is provided with a substantially hook shaped extension 11, having their free ends disposed in parallel relation to the connecting members and constituting supports or retainers for the necktie 12, Fig. 2.

In use, the necktie retainer is slipped between the folds of a turndown collar, the loop 10 located centrally or at the rear of the retainer is engaged over the rear collar button 13 and the connecting members 7 between the longitudinal member of the frame are engaged over the front collar button, thus securing the retainer in operative position. Preferably before fastening the collar and retainer in position upon the neck of the wearer, the necktie is positioned, as illustrated in Fig. 2, between the connecting members 8 and 9 and the retainers 11. It is clearly evident that the retainers are secured against accidental movement of the necktie and further retain the folds of the collar in such spaced relation as to insure free and easy longitudinal movement of the necktie.

Referring to the modification illustrated in Figs. 4 and 5, the numerals 15 indicate a pair of spaced longitudinal members connected at their opposite ends by the curved connecting members 16. In this type of necktie retainer the body or frame is relatively short as compared with the type illustrated in Figs. 1, 2 and 3 in which the frame is of substantially the same length as the collar. The longitudinal members 15 are connected centrally by a transverse connecting member 17 having a loop 18 therein adapted to engage the rear collar button 19, as illustrated in Fig. 5, so as to secure the retainer in operative position between the folds of a turndown collar. The longitudinal members 15 are connected intermediate their ends and the centrally disposed transverse connecting member 17 by diagonal connecting members 20, and in applying this type of retainer to use, the necktie is laced between the several connecting members 16, 17 and 20 and is thus secured in operative position in the collar.

What I claim is:

1. A necktie retainer including a body frame adapted to be engaged at its opposite ends with a front collar button of a collar, a rear collar button engaging loop formed centrally of said frame, and a plurality of necktie retaining members carried by said body frame.

2. A necktie retainer comprising a body frame including spaced longitudinal members, end members connecting the opposite ends of said longitudinal members, a plurality of transverse connecting members connecting the longitudinal members intermediate their ends, the centrally located transverse connecting member having a rear collar button-receiving loop adapted to be engaged over a rear collar button to limit the lateral movement of the frame between the folds of a collar.

In testimony whereof I affix my signature in presence of two witnesses.

CHARLOTTE H. CHAMPANGE.

Witnesses:
WILLIAM C. ORR,
ALICE SCHLIESMANN.

Copies of this patent may be obtained for five cents each, by addressing the "Commissioner of Patents, Washington, D. C."